(No Model.)
R. G. MARCY.
PIPE LIFTER.
No. 361,706. Patented Apr. 26, 1887.
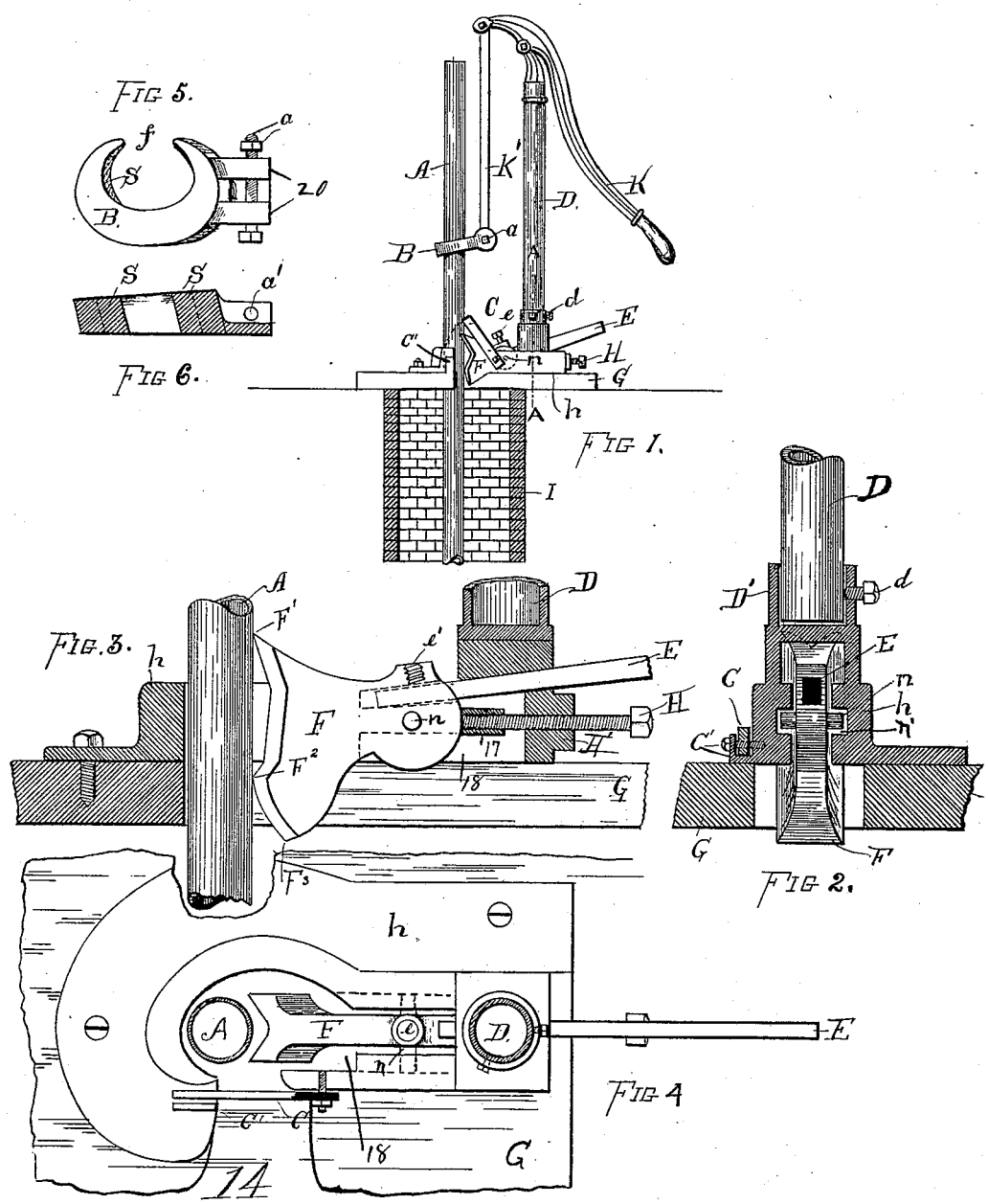

UNITED STATES PATENT OFFICE.

RUFUS G. MARCY, OF KANSAS CITY, MISSOURI.

PIPE-LIFTER.

SPECIFICATION forming part of Letters Patent No. 361,706, dated April 26, 1887.

Application filed June 24, 1886. Serial No. 206,182. (No model.)

*To all whom it may concern:*

Be it known that I, RUFUS G. MARCY, of Kansas City, Jackson county, Missouri, have invented certain new and useful Improvements in Pipe-Lifters, of which the following is a full, clear, and exact description, reference being had to the accompanying drawings, which form a part hereof.

This invention relates to a machine that may be used for the combined purposes of raising, lowering, or holding suspended at any desired point long columns of iron or pump-pipe.

The invention is designed more particularly for the purpose of raising and lowering or holding at any desired position the pipe used in pumping water from deep wells.

In the accompanying drawings, which represent a very minute and explicit manner of carrying out my invention, Figure 1 is a sectional elevation of a well to which the lifter has been applied. Fig. 2 is a detail section through the base of the machine on line A A, Fig. 1. Fig. 3 is a detail section through the base on a longitudinal line. Fig. 4 represents a plan view of the machine with the operating-handle removed. Fig. 5 is an enlarged view of the device used for gripping the pipe, and Fig. 6 is a section through the same on a longitudinal line.

The letter A represents the pipe which is to be operated upon in the well, and the letter B indicates the gripping device or the "grip" that is connected to the handle or lifting-lever K by means of the rod or link K'.

G represents a plank of suitable material and strength to form a solid base for the machine, and it is cut away at one side so, as to form an opening, 14, and so that the machine can be removed from the pipe sidewise.

*h* indicates the bed-plate or main casting of the machine, which is bolted to the plank above referred to, and is also formed with an opening in one side, for the purpose of allowing the pipe to be slipped into place and to allow of the machine being removed from the pipe sidewise. Upon the upper side of the bed-plate *h* an elevated socket, D', is cast, and in which the lower end of the standard D is removably inserted, as shown more clearly in Fig. 2. The bed-plate *h* is also formed with a longitudinal passage, 18, in which the pipe is located while being raised or lowered, and in which the holding and braking device is adapted to operate. Oppositely-located slots *n'* are formed in the sides of the said passage 18, and they extend from the opening in which the pipe is located back to the closed rear end, H', of the bed-plate.

F indicates a dog, made in the form of a casting, of iron, steel, or other suitable metal and provided with a pivot or pivots, *n*, which, by engaging with the slots *n'* in the bed-plate, hold the said dog securely in place and allow for its adjustment to different sizes of pipe. The face or cutting-edge of the dog F is formed in V shape, to enable it to partially encircle the pipe and thus take a firmer hold on the same, either in holding the pipe suspended or in lowering it into the well.

During the operation of holding the pipe the cutting-edge F' of the dog F will cut into the surface of the pipe a little way, and it is obvious that the heavier the column the tighter the dog will hold—that is, said dog will be wedged in between the end 17 of the adjusting-screw H and the surface of the pipe. During the operation of lowering the pipe the projection $F^2$ upon the working-surface of the dog will be forcibly brought into contact with the surface of the pipe by depressing the outer end of the foot-lever E; and, on the other hand, when the pipe is being lifted the dog will be also lifted until the cutting-point F' is almost disengaged from the outer surface of the pipe; nor does the heel $F^3$ of the dog interfere with the lifting operation, for when the dog is raised it is pushed back a little way into the passage in which it works, the pivots *n* sliding in the slots *n'*.

H represents an adjusting-screw that is threaded into the rear end of the bed-plate for the purpose of graduating the distance of the dog from the front end of the passage 18, and for the purpose of accommodating different sizes of pipe.

It will be observed that the end 17 of this screw presses against the rounded end of the dog, thus allowing the dog to rotate upon its pivot, and at the same time permit it to impose the pressure that is transmitted to it by the pipe upon the end of the screw. The foot-lever E, it will be observed, is removable from the dog F, its inner end being located in a socket formed in said dog just above the pivots n, and it is held in place by a set-screw, e, which engages the threaded aperture e'.

The letter D indicates a standard, to the upper end of which the hand-lever K is pivoted, and the lower end of which is inserted in the socket D' of the bed-plate. The standard is secured in said socket by means of one or more set-screws, d, which are threaded through the side of the socket and engage the lower end of the standard.

B indicates the grip or clutch, made of cast-steel or other suitable material, having an opening, f, at one side for the entrance of the pipe, and having a pair of lugs or equivalent devices, such as 20, cast integral with one end. The grip is connected to the hand lever K by means of a bolt, a, which passes through the lugs 20, or rather through a hole, a', in the lugs 20, and a rod, K', which engages the bolt with its lower end, and which has its upper end connected to said hand-lever. The fact that the grip B is attached to the rod K' at one end or side, causes it, when that particular end is raised by the operation of the hand-lever K, to take hold of the pipe in a very substantial way, and it is not liable to slip or let go.

The inner surface of the grip B is provided with sharp corners, so that the pipe may be more readily taken hold of. The letter S represents the said inner surface; and although I have shown the inner surface of the said grip inclined a little away from the end to which the lugs 20 are secured, yet I will say that this inclination of the inner surface is not at all essential to the perfect working of the device, as it may be made to grip the pipe almost as well when the said surface is located at a right angle to the lower side.

The letter A represents a piece of pipe in position for being operated upon in the well I.

C indicates a latch that is hinged at one end to the bed-plate, for the purpose of confining the pipe in the passage when the machine is at work, and its free end is adapted to drop down behind a lug, C', that is also located on the bed-plate.

The operation of the machine may be described as follows: In raising a long line of pipe from a deep well or hole in the earth, the latch C is raised, as shown by the dotted lines in Fig. 1, and the machine can then be slipped to place around the pipe. After the machine has been properly located the said latch should be dropped down again. The grip B is placed in position around the pipe, as shown in Fig. 1, and the adjusting-screw H is so gaged that the upper or cutting edge of the grip will just bear lightly against the pipe when the handle is operated. Then as the handle or lever K forces the grip downward it will slide easily in that direction; but when the raising force is applied to it it takes a firm hold and carries the pipe with it in its upward movement, and so on. At each stroke of the hand-lever the grip catches the pipe automatically, and after it has been raised to the limit of the stroke of the said hand-lever the dog F holds it while the lever is being raised for another stroke. Thus pipe and pumps can be raised from deep wells with ease, speed, and safety.

In the operation of lowering pipe a strong friction can be applied to the pipe by placing the foot on the free end of the foot-lever E, and thus easing it down gently to place.

The dog F will hold the pipe at any place, and secure it firmly while such operations as cutting a new thread or attaching more pipe are being performed, or while a pump is being adjusted. Standard D is so arranged in a socket, D', that by loosening set-screw d it can be easily lifted out and removed, if found to be in the way, and still leave the bed-plate of the machine in position with the dog holding the pipe. Thus it will be seen my invention is calculated to perform three different kinds of work—namely, lifting, holding, or lowering pipe.

Although the standard D is shown attached to the machine in such a way that it can be removed therefrom at pleasure, yet I may say that it can be formed integral with the bed-plate, if desired, and still perform very satisfactory duty; and I may say, also, that the foot-lever can be formed integral or in one piece with the dog F without detracting at all from its ability to operate successfully.

I do not herein broadly claim a clutching device provided with a hand-lever in combination with a lower cam-clamping device provided with a foot-lever; nor do I herein broadly claim a mechanism consisting of a pair of biting devices arranged in connection with pivot-bearings, the one above the other, and adapted one to grip and hold the pipe while the other is being adjusted for a new purchase.

Having thus described my invention, what I claim is—

In a pipe-lifter, a bed-plate, substantially as described, provided with a longitudinal passage, in combination with a dog having pivots operating in slots formed at the sides of said passage, and an adjustable set-screw whereby the dog may be moved back and forth to accommodate different sizes of pipe, substantially as specified.

In testimony whereof I affix my signature in presence of two witnesses.

RUFUS G. MARCY.

Witnesses:
  T. R. HILL,
  C. A. KENYON.